(12) United States Patent
Brown

(10) Patent No.: US 7,449,119 B2
(45) Date of Patent: Nov. 11, 2008

(54) **METHODS FOR CONTROLLING *MYCOBACTERIUM CHELONAE* AND REMOVING BACTERIAL CELL MEMBRANE FRAGMENTS FROM TURBULENT WATERS**

(75) Inventor: Geoffrey Brown, Dacula, GA (US)

(73) Assignee: Chemtura Corporation, Middlebury, CT (US)

( * ) Notice: Subject to any disclaimer, the term of this patent is extended or adjusted under 35 U.S.C. 154(b) by 107 days.

(21) Appl. No.: 11/459,676

(22) Filed: Jul. 25, 2006

(65) Prior Publication Data

US 2007/0023357 A1 Feb. 1, 2007

Related U.S. Application Data

(60) Provisional application No. 60/703,294, filed on Jul. 28, 2005.

(51) Int. Cl.
*C02F 1/76* (2006.01)

(52) U.S. Cl. .................. 210/753; 210/754; 210/755; 210/756

(58) Field of Classification Search .......... 210/753–756
See application file for complete search history.

(56) References Cited

U.S. PATENT DOCUMENTS

| | | | | |
|---|---|---|---|---|
| 4,279,712 | A | * | 7/1981 | Satoh et al. ............... 205/347 |
| 4,297,224 | A | * | 10/1981 | Macchiarolo et al. ....... 210/755 |
| 4,692,262 | A | | 9/1987 | Brown |
| 4,737,307 | A | | 4/1988 | Brown |
| 4,810,385 | A | * | 3/1989 | Hater et al. .................. 210/606 |
| 5,772,896 | A | | 6/1998 | Denkewicz |
| 5,779,914 | A | | 7/1998 | Brown |
| 5,858,246 | A | | 1/1999 | Rafter |
| 5,935,609 | A | | 8/1999 | Denkewicz |
| 6,071,483 | A | | 6/2000 | Pastore |
| 6,254,894 | B1 | | 7/2001 | Denkewicz |
| 6,277,288 | B1 | | 8/2001 | Gargas |
| 6,436,445 | B1 | | 8/2002 | Hei |
| 6,534,075 | B1 | | 3/2003 | Hei |
| 6,544,942 | B1 | | 4/2003 | Smith |
| 6,551,518 | B2 | | 4/2003 | Gargas |
| 6,573,336 | B1 | * | 6/2003 | Inagaki et al. ............. 525/333.5 |
| 6,593,283 | B2 | | 7/2003 | Hei |
| 6,599,432 | B2 | | 7/2003 | Kross et al. |
| 6,663,902 | B1 | | 12/2003 | Hei |
| 2002/0159917 | A1 | | 10/2002 | Swart |
| 2002/0168422 | A1 | | 11/2002 | Hei |
| 2003/0094421 | A1 | | 5/2003 | Gargas |
| 2003/0187055 | A1 | * | 10/2003 | Riker et al. ................. 514/419 |
| 2004/0164029 | A1 | * | 8/2004 | Souter et al. ................ 210/764 |
| 2006/0197058 | A1 | * | 9/2006 | Martin ..................... 252/188.1 |
| 2006/0289349 | A1 | * | 12/2006 | Hughes .................... 210/500.1 |
| 2007/0134683 | A2 | * | 6/2007 | Miller et al. .................... 435/6 |
| 2008/0118573 | A1 | * | 5/2008 | Harrison et al. ............. 424/618 |

FOREIGN PATENT DOCUMENTS

| | | | |
|---|---|---|---|
| EP | 0480779 A | * | 4/1992 |
| JP | 06153759 A | * | 6/1994 |
| WO | WO/00/48940 | | 8/2000 |
| WO | WO/02/102154 | | 12/2002 |

* cited by examiner

*Primary Examiner*—Chester T Barry
(74) *Attorney, Agent, or Firm*—Jaimes Sher

(57) ABSTRACT

Compositions containing chlorine and/or bromine in combination with chlorine dioxide are found to be synergistic against non-tuberculosis mycobacterium such as *Mycobacteria chelonae*.

20 Claims, No Drawings

METHODS FOR CONTROLLING *MYCOBACTERIUM CHELONAE* AND REMOVING BACTERIAL CELL MEMBRANE FRAGMENTS FROM TURBULENT WATERS

REFERENCE TO A RELATED APPLICATION

This application claims the benefit of U.S. provisional patent application 60/703,294 filed Jul. 28, 2005 which is relied on and incorporated herein by reference.

INTRODUCTION AND BACKGROUND

The present invention is directed to methods and compositions intended to ameliorate conditions in a circulating water system by treating such water systems to prevent problems caused by bacteria and/or cell membrane fragments from dead bacteria.

More particularly, the present invention relates to compositions containing chlorine and/or bromine in combination with chlorine dioxide that are synergistic against non-tuberculosis mycobacteria such as *Mycobacterium chelonae*. In addition, the present invention relates to a composition and method for removing hydrophobic or amphipathic materials that can be released into the air via aerosols during or after routine sanitization processes. Turbulent regulated waters such as waters found in spas, hot tubs, jetted bath tubs, decorative fountains and swimming pools with spray features can produce aerosols. On occasion, these waters may contain viable Nontuberculosis Mycobacteria (NTM) and/or cell membrane fragments from dead bacteria. Inhalation of aerosols containing NTM, such as *Mycobacterium chelonae*, or cell membrane fragments from gram-negative bacteria can result in chronic pulmonary discomfort. Therefore, one aspect of this invention relates to a method to kill *M. chelonae* using chlorine dioxide. Another aspect of the invention relates to physically removing viable NTM and bacterial fragments onto a surface or surfaces with high affinities for hydrophobic or amphipathic substances. A further aspect of the invention pertains to synergistic combinations of halogen oxidizers and chlorine dioxide that are efficacious against nontuberculosis mycobacteria. A still further aspect of the instant invention relates to compositions and methods for killing NTM such as *M. chelonae* while also physically removing dead and/or living bacteria or cell fragments with the aid of materials that are capable of binding to molecules that are essentially or partially hydrophobic.

Regulated waters are those natural and man made bodies that are used for industrial, recreational and or decorative purposes, and which can be treated with chemicals such as biocides, halogen and non-halogen shock treatments, slimicides, corrosion inhibitors, pH adjusting compounds, chelating agents and stain removers. While it is generally accepted that regulated waters such as swimming pools, metal cutting fluids, hot tubs, spas, jetted tubs and fountains contain fewer microorganisms than non-regulated waters such as lakes, streams and rivers, certain microbes are inherently tolerant to or can become resistant to certain biocides. Under these circumstances, the tolerant/resistant organisms can proliferate in such regulated water systems and can cause disease, dermal irritation or allergic reactions.

Mycobacteria of the *mycobacterium tuberculosis* complex are responsible for tuberculosis. Mycobacteria other than *M. leprae* (etiologic agent for leprosy) are referred to as nontuberculosis mycobacteria (NTM). NTM are ubiquitous in the environment and most species are either not pathogenic for humans or are rarely associated with disease. However, M chelonae is one member of NTM group that is potentially pathogenic.

Mycobacteria have a waxy coating consisting of mycolic acid, which has the general structure $R_1$—CH(OH)—CH$(R_2)$—COOH with $R_1$ and $R_2$ consisting of fatty acid chain 50-56 and 22-26 carbon atoms, respectively. The hydrophobic mycolic acid coating confers a high degree of tolerance to traditional biocides such as chlorine. Some researchers have reported that mycobacteria such as *M. chelonae* exist in hot tubs as a "floating slime layer" that can become airborne when the aeration jets are operating.

While treating water with biocides is an effective means of controlling the proliferation of most microorganisms, the treatment process itself can rupture the outer bacterial cell membranes of gram-negative bacteria such as *E. coli*. The resulting bacterial cell membrane fragments are called endotoxins As is the case with NTM, turbulent regulated waters, such as but not limited to spas and hot tubs, can produce aerosols that may contain endotoxins that can be inhaled by persons in proximity to said waters. NTM such as *M. chelonae* and endotoxins have been implicated as the causative agents of a pulmonary condition known generally as Hypersensitivity Pneumonitis or Granulomatous pneumonitis.

It is known in the art to use chemicals to treat regulated waters with a variety of products in order to perform functions, such as, but not limited to, sanitation, clarification, slime removal, aiding filtration, biofouling prevention and retarding scale and corrosion formation. It is also known in the art to use chlorine dioxide in the treatment of these regulated waters. For instance, Brown (U.S. Pat. No. 5,779,914) demonstrated that chlorine dioxide was capable of destroying biofilms in waters containing polyhexamethylene biguanide. Rafter disclosed methods for purifying water by adding oxides of chlorine to water, such as chlorine dioxide, in combination with metal ions (U.S. Pat. No. 5,858,246). Denkewicz also disclosed the use of silver and alumina in combination with chlorine dioxide as self-regulating compositions and methods to purify water in U.S. Pat. No. 6,254,894. In U.S. Pat. No. 6,277,288, Gargas described a water purification system that takes advantage of the synergistic benefits of using ozone and electrolytic chlorination. The electrolytic process disclosed by Gargas also can produce an oxychlorine species such as chlorine dioxide. In addition, in U.S. Pat. No. 6,551,518, Gargas disclose additional benefits of using ozonation and electrolytic chlorine generation to treat water while concomitantly generating an oxychlorine species such as chlorite, chlorine dioxide or chlorate.

The prior art fails to teach that chlorine dioxide alone, or in combination with halogens and/or in combination with substances that are capable of removing endotoxins can mitigate the reputed causative agents of hypersensitivity pneumonitis (NTM and endotoxins) in regulated waters capable of generating appreciable levels of aerosols. Moreover, while U.S. Pat. Nos. 5,858,246 and 6,254,894 show chlorine dioxide with free chlorine, these prior technologies also stipulate the need for antimicrobial effective levels of metals. The instant invention is unique in that metals are not required as co-biocides. Compositions and methods provided herein not only result in the killing of resistant organisms, but also remove dead, endotoxin-containing cell fragments.

In addition to the existing state of the art, the use of chlorine dioxide as a treatment for mycobacteria has been described in recent literature. For instance, an article published by the Centers for Disease Control and Prevention (CDC) by J. O. Falkinham entitled, "Mycobacterial Aerosols and Respiratory Disease," states that hypersensitivity pneumonitis or granulomatous pneumonitis in swimming pool attendants was caused by mycobacteria and possibly by bacterial endotoxins (see, www.cdc.gov/ncidod/eid/vol9no7/02-0415.htm). Moreover, the same article implicated *M. avium* as the most likely cause of hypersensitivity pneumonitis and mycobacterial pulmonary disease hot tub users.

It is also known in the art to remove hydrophobic substances from aqueous milieu with the use of lipophilic materials. For instance, in U.S. Pat. Nos. 5,437,793, 5,698,139, 5,837,146, 6,180,010, Alper discloses compositions and methods for removing hydrocarbons from water. Similarly, Miller (U.S. Pat. No. 6,056,881) disclosed a device for removing organic substances from bilge water.

SUMMARY OF THE INVENTION

Regulated bodies of water which are capable of generating aerosols such as, but not limited to, spas, hot tubs, swimming pools with spray features and decorative fountains, have been implicated in outbreaks of acute or chronic pulmonary syndromes such as Pontiac Fever, Legionnaire's Disease and hypersensitivity pneumonitis. Since NTM, such as *M. chelonae* and endotoxins have been implicated as the most probable causative agents for these maladies, compositions and methods for killing and/or removing them from water are needed. The instant invention discloses such methods and compositions.

Clearly, despite the obvious and salubrious benefits associated with proper sanitization, important risk factors remain for persons exposed to waters capable of producing aerosols. Therefore, an invention capable of measurably reducing the impact of these factors is needed. The present invention fulfills that needs on multiple levels, by effectively killing NTM such as such as *M. chelonae* and physically removing endotoxins from regulated waters by trapping them onto surfaces capable of binding lipophilic substances.

A number of natural and synthetic materials-organic and inorganic-capable of absorbing or adsorbing lipids is known in the art. Synthetic sorbents include man-made materials such as polyurethane, polyethylene, and polypropylene and are designed to adsorb liquids onto their surfaces. Similarly, other synthetic oleophiles include cross-linked polymers and rubber materials. Natural organic sorbents include peat moss, straw, hay, sawdust, ground corncobs, feathers, and other readily available carbon-based products. Natural inorganic sorbents such as clay, perlite, vermiculite, glass wool, sand or volcanic ash can also be used to remove lipids from water. It is understood that any natural or synthetic material that can effectively remove hydrophilic or partially hydrophilic substances from water lies within the scope of the present invention and can be used according to the present invention. One skilled in the art also understands that factors such as surface area, porosity, particle size, etc. can impact the efficiency of lipid removal and that these factors can be manipulated and tailored to suit a particular need or application. Additionally, the artisan comprehends that the lipid-binding materials could be applied to surfaces, integrated into other materials, broadcast into liquid milieu, etc. based on the application.

The present invention discloses chlorine dioxide as an effective biocide for controlling NTM, such as *M. chelonae*. It will be understood by those skilled in the art that chlorine dioxide can be applied to water as $ClO_2$ gas, pre-dissolved in solution or produced in situ. In situ formation can result by adding dry or liquid components, that when mixed, form chlorine dioxide. Therefore, the scope of the invention is not limited or constrained by the method or methods used to establish a level of chlorine dioxide in the body of regulated water. Any suitable source of chlorine dioxide or compound capable of releasing chlorine dioxide meeting the above conditions can be used for purposes of the present invention. Sodium chlorite is one such compound. For all embodiments of the present invention, chlorine dioxide is used at a concentration of 0.1-100 ppm within the regulated water, with the preferred concentration ranging from 1-20 ppm.

Therefore, in one aspect the invention resides in a method of treating water with a composition for the control of non-tuberculoses mycobacterium (NTM) comprising adding a source of chlorine dioxide to a regulated body of water in need thereof and a natural or synthetic material capable of absorbing or adsorbing lipids from the water to thereby physically remove endotoxins present in said water.

Chlorine is the most commonly used sanitizer for treating regulated waters, whether the waters are capable of generating appreciable aerosols or not. While chlorine is effective against most of the organisms capable of causing disease in these waters, NTM present a more difficult challenge. The waxy coating found on NTM, slows the uptake of nutrients into the bacteria, causing them to grow more slowly than other bacterial species. Concomitantly, the waxy coating also confers exceptional antimicrobial resistance to traditional biocides such as chlorine.

Destruction of pathogenic organisms is the most profound and immediate benefit provided by sanitizing chemicals such as chlorine and bromine. One consequence of sanitizing regulated waters, however, is that endotoxins are released when gram-negative organisms are killed. Since these endotoxins can be aerosolized and inhaled, the instant invention discloses a method for reducing the levels of these compounds in water. Without wishing to be limited by scope, applicants believe these endotoxin-binding materials could be applied in any manner that allows said material to contact the body of water. For example, the material could be used as a filter, filter aid or adjunct to a traditional filter. Alternatively, it can be added directly to the main body of regulated water or as a covering or coverings for return lines, jets, skimmers, drains, etc. Endotoxin-binding materials are those materials that are capable of binding hydrophobic or partially hydrophobic substances, thereby removing them from the surrounding water.

In one aspect of the invention, chlorine dioxide or a composition capable of generating chlorine dioxide is added intermittently to a regulated body of water capable of producing aerosols in quantities sufficient to kill or control Non-Tuberculosis Mycobacteria (NTM). More specifically, chlorine dioxide or source of chlorine dioxide is added in a slug dose at defined intervals in such a way as to not maintain a residual of chlorine dioxide in the pool at all times. By the term "slug dose" is meant that the chlorine dioxide or source thereof is added substantially at the same time or all at once. For all embodiments of the present invention, intermittent slug doses of chlorine dioxide establish a concentration of 0.1-100 ppm within the regulated water, with the preferred concentration ranging from 1-10 ppm and most preferred 1-5 ppm.

In another embodiment of the invention, chlorine dioxide or source thereof is added to a regulated body of water capable of producing aerosols, said body of water also containing at least one additional halogen-based oxidizing chemical; that is, chlorine and/or biomine such as hypochlorous or hypobromous acid. In this embodiment, measurable residuals of the halogen oxidizer remain in the regulated water to effect disinfection and chlorine dioxide is added intermittently in order to kill or control NTM, such as *M. chelonae*. Halogen residuals are dictated by label instructions. Application of chlorine and/or bromine at use rates consistent with product labels is within the scope of the present invention. Generally the additional chlorine and/or bromine oxidizing agent is used in the concentration of 1-50 ppm, preferably 1-20 ppm and most preferably 2-10 ppm.

In another embodiment of the invention, chlorine dioxide or source thereof is added intermittently to a regulated body of water capable of producing aerosols in quantities sufficient to kill NTM. In addition, the same regulated body of water is contacted with a material capable of removing endotoxins from said regulated water. The preferred application frequency of chlorine is about every 4-6 weeks to coincide with routine cleaning of the filter used by the spa, hot tub, whirlpool or other turbulent body. However, the 4-6 week application is only a guide, and the instant invention could be used more frequently if conditions warrant (e.g., malodors and visible growths on surfaces).

In another aspect of the invention, chlorine dioxide or source of chlorine dioxide is added intermittently to a regulated body of water capable of producing aerosols in quantities sufficient to kill NTM, and said water contains measurable residuals of halogen-based oxidizing chemicals such as hypochlorous or hypobromous acid. In addition, the same regulated body of water is contacted with a natural and/or synthetic material capable of binding to and removing hydrophobic or partially hydrophobic materials, such as, but not limited to, endotoxins as described above.

The chlorine dioxide or source for chlorine dioxide can be introduced into the water system in a variety of ways. Chlorine dioxide can be produced in situ by a device capable of generating chlorine dioxide gas and applying it to the body of water. Another means of producing chlorine dioxide in situ is by pre-mixing sodium chlorite with acidic materials such as hydrochloric acid or sodium bisulfate. While these methods are effective, chlorine dioxide generation equipment is costly and may not be practical for residential bodies of water. Also, pre-mixing reactive chemicals can pose serious safety hazards. Therefore, a more suitable method of applying chlorine dioxide is to add a single, solid product to the water that releases chlorine dioxide as it dissolves. The product could take the form of a tablet, puck, flowable powder or granules. Dry products might contain sodium chlorite and a substance capable of converting chlorite ($ClO_2^-$) to chlorine dioxide ($ClO_2$). Substances that might be used to covert chlorite to chlorine dioxide are dry acids such as, but not limited to, sodium bisulfate and chlorine-releasing compounds such as dichloroisocyanurate. It is understood that other means of generating chlorine dioxide, such as generation via chlorate ($ClO_3^-$) in lieu of $ClO_2^-$ would be within the scope of the instant invention. A particularly useful embodiment of the invention relates to a kit containing the solid source of chlorine dioxide and the solid substrate for removing the endotoxins.

DETAILED EMBODIMENTS OF INVENTION

Example 1

One aspect of the instant invention is the use of chlorine dioxide alone, or in a synergistic combination with chlorine or bromine to kill M. chelonae in turbulent waters capable of generating aerosols. Those skilled in the art understand that chlorine is most often introduced into the regulated bodies by applying chlorine gas, sodium hypochlorite, calcium hypochlorite, lithium hypochlorite, trichloroisocyanurate or dichloroisocyanurate. In any case, hypochlorous acid is formed when any of the aforementioned are added to water. The skilled artisan also understands that bromine can be introduced into the regulated water by adding a bromide salt in conjunction with an oxidizer capable of converting bromide ($Br^-$) to bromine ($Br^+$). A subset of suitable oxidizers comprises those that produce hypochlorous acid when added to water and potassium monopersulfate. Alternatively, solid heterocyclic compounds, such as hydantoins, containing covalently bound bromine can be added to the turbulent water. Similar to chlorine, compounds capable of releasing bromine ultimately form hypobromous acid when added to water. The data contained in Table 1 demonstrate that chlorine dioxide kills M. chelonae more effectively than bromine and much more effectively than chlorine. However, when used in combination, synergy is observed. Synergy can be determined when a combination using reduced concentrations of biocides is more effective than higher concentrations of the individual components. Since synergy cannot be predicted, it is inherently surprising and novel.

In the experiments below, M. chelonae was cultured on 7H11 agar for 5-7 days at 37° C. Cells were harvested in dilute phosphate water and used as the inoculum for the experiments. The experimental protocol was adapted from the time kill procedure outlined in AOAC (Association of Official Analytical Chemists) method 965.13 for Water Disinfectants for Swimming Pools.

An inoculum containing $10^8$ colony forming units (cfu) per milliliter was subjected to various concentrations of chlorine dioxide, chlorine, bromine or combinations thereof. At intervals of 0.5, 1, 2, 3, 4, 5 and 10 minutes, aliquots of the inoculum/biocide combination were removed and the biocides neutralized with a combination of sodium sulfite, sodium thiosulfate and sodium metabisulfite. Surviving organisms were then plated onto 7H11 agar. Table 1 below shows the log reductions in bacteria over time.

Three parts per million of chlorine dioxide provided a 6-log reduction of M chelonae in 0.5 minutes. However, 50 ppm of chlorine (as $Cl_2$) were needed to obtain the same 6-log reduction in 10 minutes (data not shown). Clearly, chlorine dioxide provided adequate killing of M. chelonae by itself, but the data in Table 1 demonstrate that chlorine dioxide is synergistic with chlorine. Therefore, substantially lower concentrations of each could be used to kill M. chelonae in waters capable of generating aerosols.

As the data in Table 1 show, a concentration of 0.25 ppm $ClO_2$ resulted in a 3-log reduction of M. chelonae at 10 minutes. Doubling the concentration to 0.5 ppm $ClO_2$ did not double the performance (i.e., a 6-log reduction) and only resulted in a 4-log reduction. Similarly, 12.5 ppm chlorine gave a 3-log reduction over 10 minutes, and doubling that to 25 ppm chlorine resulted in no additional log reductions over the same 10 minute time period. In essence, doubling the concentrations of chlorine and chlorine dioxide did not proportionately affect the rate of kill. Surprisingly though, when 0.25 ppm $ClO_2$ and 12.5 ppm chlorine were combined, a 7-log reduction was achieved in 10 minutes. Therefore, the combination of chlorine and chlorine dioxide resulted in a greater log reduction of M. chelonae than anticipated since merely doubling the concentrations of chlorine and chlorine dioxide had little effect on the rates of kill. Therefore, the increase in biocidal efficacy against M. chelonae observed after combining chlorine and chlorine dioxide was not merely additive, but was synergistic.

TABLE 1

Log Reduction of *M. chelonae* using Chlorine Dioxide and Chlorine.

| Biocide (ppm) | 0.5 | 1 | 2 | 3 | 4 | 5 | 10 |
|---|---|---|---|---|---|---|---|
| 3 ppm $ClO_2$ | 6 | 6 | 6 | 6 | 6 | 6 | 6 |
| 0.75 ppm $ClO_2$ | 3 | 4 | 5 | 5 | 6 | 6 | 6 |
| 0.5 ppm $ClO_2$ | 3 | 3 | 4 | 4 | 4 | 4 | 4 |
| 0.25 ppm $ClO_2$ | 3 | 3 | 3 | 3 | 3 | 3 | 3 |
| 25 ppm Chlorine | 3 | 3 | 3 | 3 | 3 | 3 | 3 |
| 12.5 ppm Chlorine | 3 | 3 | 3 | 3 | 3 | 3 | 3 |
| 0.25 ppm $ClO_2$ + 12.5 ppm Chlorine | 3 | 3 | 3 | 3 | 4 | 4 | 7 |

Example 2

Another aspect of the present invention is the removal of endotoxins from turbulent waters by contacting said water with a material or materials capable of binding to hydrophobic or partially hydrophobic substances. For this example, the ability of sand coated with MYCELX® to remove bacterial endotoxins from water was tested (MYCELX® is a registered trademark of Mycelx Technologies Corporation and is believed to be a coagulant containing a glyceride such as linseed oil, a polymer such as poly(isobutyl methacrylate), and a solvent such as 2,2,4-trimethyl-1,3-pentanediol monoisobutyrate and MYCELX® has been shown to remove hydrocarbons from water. One skilled in the art understands that the scope of the instant invention encompasses all materials capable of binding to hydrophobic or partially hydrophobic substances that are conformable to use in turbulent bodies such as, but not limited to, spas, hot tubs and whirlpools. For instance, polymers such as polypropylene and polystyrene are capable of binding hydrophobic substances and are structurally simpler than Mycelx®.

For the duplicate experiments, one gram of MYCELX® coated sand and one gram of untreated pool sand were placed into pyrogen free (endotoxin free) test tubes. A solution of 0.6 Endotoxin Units per milliliter (EU/ml) was prepared using standardized endotoxin from the gram negative bacterium *E. coli* and pyrogen free water. Two milliliters of this solution was added to the test tubes containing the coated and uncoated sand and each tube was swirled vigorously. Endotoxin levels were measured for each sample using the *Limulus Amebocyte* Lysate (LAL) test method and all reagents and methods were purchased from Charles River Laboratories, Inc. Endotoxin concentration was determined against a standard curve ranging from 0 to 1.2 EU/ml. The presence of endotoxin was evidenced by a yellow color that was quantified spectrophotometrically at 405 nm. The experiments were performed in duplicate and the data are contained in Tables 2 and 3.

The data show that contacting MYCELX® coated sand with endotoxin-containing water reduced the concentration of the endotoxin. By contrast, untreated pool sand raised the level of endotoxin, putatively by releasing endotoxins already on the sand itself.

Clearly, a substance capable of binding hydrophobic or partially hydrophobic substances, can remove endoxtins from aqueous milieu.

TABLE 2

Removal of Bacterial Endotoxins.

| Sample | Endotoxin Units/ml |
|---|---|
| MYCELX® Coated Sand | 0.100 |
| Untreated Pool Sand | 4.340 |
| Endotoxin Control | 1.107 |

TABLE 3

Repeat of Experiment to Remove Bacterial Endotoxins.

| Sample | Endotoxin Units/ml |
|---|---|
| MYCELX Coated Sand | 0.252 |
| Untreated Pool Sand | 1.001 |
| Endotoxin Control | 0.695 |

The present invention provides a novel means of killing NTM, such as M chelonae, and removing bacterial endotoxins from regulated bodies of water capable of producing aerosols. A partial listing of these types of regulated bodies includes, spas, hot tubs, pools with spray features and decorative fountains. Disclosed herein are methods and compositions that use chlorine dioxide alone, in a synergistic combination with a halogen oxidizer and/or with a material that is capable of removing bacterial endotoxins from water.

For all embodiments of the present invention, intermittent slug doses of chlorine dioxide establish a concentration of 0.1-100 ppm within the regulated water, with the preferred concentration ranging from 1-10 ppm. Since the applications are intermittent, the regulated body will usually have no detectable chlorine dioxide levels. Without wishing to be bound by scope, intermittent application can range from once a day to once every year. The preferred application frequency is in the range of once every 4-6 weeks to coincide with routine cleaning of the filter used by the spa, hot tub, whirlpool or other turbulent body When the additional halogen oxidizing agents; i.e., chlorine and/or bromine are used for sanitation of the regulated body of water, measurable residuals will be maintained according to the label directions on the products that produce said halogens within the regulated body. Typically, this will be 1-4 ppm and 3-6 ppm for chorine and bromine, respectively. Appropriate halogen residuals should be maintained whenever bathers are in the spa or hot tub. If the spa is not in use, there is no requirement to maintain a residual.

Substances capable of removing endotoxins can be added to the regulated body in several ways. For example, these substances can be applied to the filter as a coating, broadcast into the body of water, added to water permeable pouches that are placed into the bulk water or into filter wells, etc. It is understood that any means of applying endotoxin removing materials to the regulated body lie within the scope of the instant invention. These substances can be powders that bind to endotoxins when added to a regulated body of water. The endotoxin/powder complex is removed by the filter or filters over time. Alternatively, the endotoxin removing substances can be non-flowable, porous solid substrates that can cover the ports where the regulated water enters or exits the main body of said water. On a spa or hot tub, for example, the solid substrate can be placed onto the drain ports and return lines. Also, the substrate can be a filter, or a coating on a filter, whereby endotoxins are removed as water contacts the filter. The preferred embodiment is an insoluble substrate that can act as a filter or as a covering for the ports where the regulated water enters and exits the main body of water.

Further variations and modifications of the foregoing will be apparent to those skilled in the art and are intended to be encompassed by the claims appended hereto.

I claim:

1. A method of treating water in a regulated body of water in need of treatment to control non-tuberculoses mycobacterium therein and to remove bacterial cell fragment-derived endotoxins therefrom, said method comprising adding to said water the combination of: a) a source of chlorine dioxide in a quantity effective to kill or control said non-tuberculoses mycobacterium; and b) a natural or synthetic material capable of absorbing or adsorbing lipids from said water to thereby physically remove said endotoxins present in said water.

2. The method according to claim 1, wherein said chlorine dioxide is added in a slug dose at defined intervals.

3. The method according to claim 1, wherein said water contains an additional halogen-based oxidizing agent.

4. The method according to claim 1, wherein said natural or synthetic material adsorbs or absorbs hydrophilic or partially hydrophilic substances from said water.

5. A method for controlling *Mycobacterium chelonae* in and removing bacterial cell fragment-derived endotoxins from a body of water in need of said control and removal, said method comprising adding to said body of water the combination of: a) a source of chlorine dioxide in a quantity effective to kill or control said *Mycobacterium chelonae*, and added at defined intervals so that a residual of chlorine dioxide is not maintained in said body of water; and b) a lipid-binding material effective to physically remove said endotoxins present in said water.

6. The method according to claim 5, wherein the source of chlorine dioxide is added to provide 0.1 to 100 ppm chlorine dioxide in the water at the time of introduction into the water.

7. The method according to claim 5, wherein the water also contains additional halogen-based oxidizing chemicals to maintain measurable residuals of halogen oxidizer in said water.

8. The method according to claim 5, wherein the defined intervals are once a day to once every year.

9. The method according to claim 8, wherein the defined intervals are once every 4 to 6 weeks.

10. The method according to claim 1, wherein the source of chlorine dioxide is added to provide 0.1 to 100 ppm chlorine dioxide in the water at the time of introduction into the water.

11. The method according to claim 1, wherein the source of chlorine dioxide is free of metals.

12. The method according to claim 1, wherein the source of chlorine dioxide is produced in situ.

13. The method according to claim 1, further comprising depositing said natural or synthetic material on a filter which is then placed into a body of said water.

14. The method according to claim 1, wherein said natural or synthetic material is broadcast into a body of said water.

15. The method according to claim 1, wherein said natural or synthetic material is placed in a pouch which is then placed in contact with said water.

16. The method according to claim 1, wherein said natural or synthetic material is removed from said water.

17. The method according to claim 1, wherein said natural or synthetic material is an insoluble substrate.

18. A method for controlling non-tuberculoses mycobacterium in a body of water in need thereof comprising adding to said body of water a source of chlorine dioxide and chlorine and/or bromine wherein the source of chlorine dioxide is added to provide 0.1 to 5 ppm chlorine dioxide and the chlorine and/or bromine is present in an amount of 1 to 50 ppm.

19. The method according to claim 18 wherein the amount of chlorine or bromine is 1 to 20 ppm and the amount of chlorine dioxide is 0.25 to 3 ppm.

20. The method according to claim 18 wherein the amount of chlorine or bromine is 2 to 10 ppm.

* * * * *